(12) United States Patent
Cisler et al.

(10) Patent No.: US 8,775,378 B2
(45) Date of Patent: Jul. 8, 2014

(54) CONSISTENT BACKUP OF ELECTRONIC INFORMATION

(71) Applicant: Apple Inc., Cupertino, CA (US)

(72) Inventors: Pavel Cisler, Los Gatos, CA (US); Eric A. Weiss, Paris (FR); Peter McInerney, Cupertino, CA (US); Dominic B. Giampaolo, Mountain View, CA (US)

( * ) Notice: Subject to any disclaimer, the term of this patent is extended or adjusted under 35 U.S.C. 154(b) by 0 days.

(21) Appl. No.: 13/658,619

(22) Filed: Oct. 23, 2012

(65) Prior Publication Data

US 2013/0046734 A1    Feb. 21, 2013

Related U.S. Application Data

(63) Continuation of application No. 11/499,256, filed on Aug. 4, 2006, now Pat. No. 8,311,988.

(51) Int. Cl.
*G06F 7/00*      (2006.01)
*G06F 17/00*    (2006.01)

(52) U.S. Cl.
USPC .......................................... 707/646; 707/690

(58) Field of Classification Search
USPC ................... 707/643–647, 690, 640
See application file for complete search history.

(56) References Cited

U.S. PATENT DOCUMENTS

| | | | |
|---|---|---|---|
| 5,150,407 A | 9/1992 | Chan | |
| 5,150,473 A | 9/1992 | Zulch | |
| 5,163,148 A | 11/1992 | Walls | |
| 5,276,867 A | 1/1994 | Kenley et al. | |
| 5,349,658 A | 9/1994 | O'Rourke et al. | |
| 5,369,570 A | 11/1994 | Parad | |
| 5,659,614 A | 8/1997 | Bailey | |
| 5,664,186 A | 9/1997 | Bennett et al. | |
| 5,680,562 A | 10/1997 | Conrad et al. | |
| 5,736,974 A | 4/1998 | Selker | |
| 5,745,669 A | 4/1998 | Hugard et al. | |
| 5,754,178 A | 5/1998 | Johnston et al. | |
| 5,758,359 A | 5/1998 | Saxon | |
| 5,790,120 A | 8/1998 | Lozares et al. | |
| 5,802,175 A | 9/1998 | Kara | |

(Continued)

FOREIGN PATENT DOCUMENTS

| | | |
|---|---|---|
| EP | 629950 | 12/1994 |
| EP | 1152352 | 11/2001 |

(Continued)

OTHER PUBLICATIONS

"Apple Previews Mac OS X Leopard," Aug. 7, 2006, [Online] [Retrieved on Nov. 26, 2007] Retrieved from the Internet: URL:http://www.apple.com/pr/library/2006/aug/07leopard.html, pp. 1-2.

(Continued)

*Primary Examiner* — James E Richardson
(74) *Attorney, Agent, or Firm* — Fish & Richardson P.C.

(57) ABSTRACT

Systems and methods are provided for performing backup operations while a user is using a device. In one implementation, a method is provided. A backup operation of data including a plurality of related items is initiated. Modifications to one or more items of the plurality of related items are monitored for during the backup operation. The backup operation is completed. If a modification occurred to one or more items, a second backup operation is performed for the modified items.

20 Claims, 9 Drawing Sheets

(56) References Cited

U.S. PATENT DOCUMENTS

| | | | |
|---|---|---|---|
| 5,818,936 A | 10/1998 | Mashayekhi | |
| 5,819,032 A | 10/1998 | De Vries et al. | |
| 5,819,292 A | 10/1998 | Hitz et al. | |
| 5,831,617 A | 11/1998 | Bhukhanwala | |
| 5,832,526 A | 11/1998 | Schuyler | |
| 5,961,605 A | 10/1999 | Deng et al. | |
| 5,987,566 A | 11/1999 | Vishlitzky et al. | |
| 6,006,227 A | 12/1999 | Freeman et al. | |
| 6,023,506 A | 2/2000 | Ote et al. | |
| 6,097,313 A | 8/2000 | Takahashi et al. | |
| 6,112,318 A | 8/2000 | Jouppi et al. | |
| 6,134,660 A | 10/2000 | Boneh et al. | |
| 6,167,532 A | 12/2000 | Wisecup | |
| 6,188,405 B1 | 2/2001 | Czerwinski et al. | |
| 6,269,381 B1 | 7/2001 | St. Pierre et al. | |
| 6,366,988 B1 | 4/2002 | Skiba et al. | |
| 6,396,500 B1 | 5/2002 | Qureshi et al. | |
| 6,397,308 B1 | 5/2002 | Ofek et al. | |
| 6,424,626 B1 | 7/2002 | Kidambi et al. | |
| 6,460,055 B1 | 10/2002 | Midgley et al. | |
| 6,574,733 B1 | 6/2003 | Langford | |
| 6,604,118 B2 | 8/2003 | Kleiman et al. | |
| 6,625,704 B2 | 9/2003 | Winokur | |
| 6,629,129 B1 | 9/2003 | Bookspan et al. | |
| 6,636,937 B2 | 10/2003 | Peter | |
| 6,638,313 B1 | 10/2003 | Freeman et al. | |
| 6,701,454 B1 | 3/2004 | Fischer et al. | |
| 6,711,572 B2 | 3/2004 | Zakharov et al. | |
| 6,714,201 B1 | 3/2004 | Grinstein et al. | |
| 6,714,952 B2 | 3/2004 | Dunham et al. | |
| 6,725,427 B2 | 4/2004 | Freeman et al. | |
| 6,728,735 B1 | 4/2004 | Fong | |
| 6,768,999 B2 | 7/2004 | Prager et al. | |
| 6,785,751 B1 | 8/2004 | Connor | |
| 6,785,786 B1 | 8/2004 | Gold et al. | |
| 6,801,229 B1 | 10/2004 | Tinkler | |
| 6,836,657 B2 * | 12/2004 | Ji et al. | 455/419 |
| 6,857,001 B2 | 2/2005 | Hitz et al. | |
| 6,892,211 B2 | 5/2005 | Hitz et al. | |
| 6,901,493 B1 | 5/2005 | Maffezzoni | |
| 6,918,124 B1 | 7/2005 | Novik et al. | |
| 6,947,556 B1 | 9/2005 | Matyas et al. | |
| 6,948,039 B2 | 9/2005 | Biessener et al. | |
| 6,959,368 B1 | 10/2005 | St. Pierre et al. | |
| 6,993,710 B1 | 1/2006 | Coad et al. | |
| 7,072,916 B1 | 7/2006 | Lewis et al. | |
| 7,099,900 B1 | 8/2006 | Bromley et al. | |
| 7,103,740 B1 | 9/2006 | Colgrove et al. | |
| 7,107,527 B2 | 9/2006 | Takahashi et al. | |
| 7,111,136 B2 | 9/2006 | Yamagami | |
| 7,133,902 B2 | 11/2006 | Saha et al. | |
| 7,134,026 B2 | 11/2006 | Horiuchi et al. | |
| 7,155,486 B2 | 12/2006 | Aoshima et al. | |
| 7,174,352 B2 | 2/2007 | Kleiman et al. | |
| 7,185,028 B2 | 2/2007 | Lechner | |
| 7,200,617 B2 | 4/2007 | Kibuse | |
| 7,222,194 B2 | 5/2007 | Kano et al. | |
| 7,257,717 B2 | 8/2007 | Huang | |
| 7,275,075 B2 | 9/2007 | Cannon | |
| 7,284,190 B2 | 10/2007 | Chellis et al. | |
| 7,289,973 B2 | 10/2007 | Kiessig et al. | |
| 7,318,134 B1 | 1/2008 | Oliveira et al. | |
| 7,320,076 B2 | 1/2008 | Caronni | |
| 7,386,801 B1 | 6/2008 | Horvitz et al. | |
| 7,418,619 B1 | 8/2008 | Uhlmann et al. | |
| 7,434,164 B2 | 10/2008 | Salesin et al. | |
| 7,434,177 B1 | 10/2008 | Ording et al. | |
| 7,440,125 B2 | 10/2008 | Maekawa et al. | |
| 7,483,693 B2 | 1/2009 | Lueng et al. | |
| 7,505,762 B2 | 3/2009 | Onyon et al. | |
| 7,518,611 B2 | 4/2009 | Boyd et al. | |
| 7,558,930 B2 | 7/2009 | Kitamura et al. | |
| 7,559,016 B1 | 7/2009 | Rakowski et al. | |
| 7,574,459 B2 | 8/2009 | Sen et al. | |
| 7,590,668 B2 | 9/2009 | Kathuria et al. | |
| 7,596,586 B2 | 9/2009 | Gokhale et al. | |
| 7,600,133 B2 | 10/2009 | Long et al. | |
| 7,624,133 B1 | 11/2009 | Ojalvo | |
| 7,630,021 B2 | 12/2009 | Matsuzaka et al. | |
| 7,660,817 B2 | 2/2010 | Smith et al. | |
| 7,669,141 B1 | 2/2010 | Pegg | |
| 7,676,689 B1 | 3/2010 | Shioyama et al. | |
| 7,711,771 B2 | 5/2010 | Kirnos | |
| 7,734,594 B2 | 6/2010 | Wang | |
| 7,739,622 B2 | 6/2010 | DeLine et al. | |
| 7,809,687 B2 | 10/2010 | Cisler et al. | |
| 7,809,688 B2 | 10/2010 | Cisler et al. | |
| 7,836,311 B2 | 11/2010 | Kuriya et al. | |
| 7,853,566 B2 | 12/2010 | Cisler et al. | |
| 7,853,567 B2 | 12/2010 | Cisler et al. | |
| 7,856,424 B2 | 12/2010 | Cisler et al. | |
| 7,860,839 B2 | 12/2010 | Cisler et al. | |
| 7,882,072 B1 | 2/2011 | Axe et al. | |
| 7,934,064 B1 | 4/2011 | Per et al. | |
| 7,974,948 B2 | 7/2011 | Baer et al. | |
| 8,010,900 B2 | 8/2011 | Hart et al. | |
| 8,055,911 B2 | 11/2011 | Feng et al. | |
| 8,099,392 B2 | 1/2012 | Paterson et al. | |
| 8,166,415 B2 | 4/2012 | Cisler et al. | |
| 8,209,308 B2 | 6/2012 | Rueben et al. | |
| 8,229,897 B2 | 7/2012 | Cannon et al. | |
| 2001/0047368 A1 | 11/2001 | Oshinsky et al. | |
| 2002/0016912 A1 | 2/2002 | Johnson | |
| 2002/0023198 A1 | 2/2002 | Kokubun et al. | |
| 2002/0046220 A1 | 4/2002 | Freeman et al. | |
| 2002/0054158 A1 | 5/2002 | Asami | |
| 2002/0063737 A1 | 5/2002 | Feig et al. | |
| 2002/0065999 A1 * | 5/2002 | Kikuchi et al. | 711/162 |
| 2002/0080180 A1 | 6/2002 | Mander et al. | |
| 2002/0107886 A1 | 8/2002 | Gentner et al. | |
| 2002/0112237 A1 | 8/2002 | Kelts | |
| 2002/0120648 A1 | 8/2002 | Ball et al. | |
| 2002/0156921 A1 | 10/2002 | Dutta et al. | |
| 2002/0160760 A1 | 10/2002 | Aoyama | |
| 2002/0174283 A1 | 11/2002 | Lin | |
| 2003/0016248 A1 | 1/2003 | Hayes | |
| 2003/0018878 A1 | 1/2003 | Dorward et al. | |
| 2003/0050940 A1 | 3/2003 | Robinson | |
| 2003/0063128 A1 | 4/2003 | Salmimaa et al. | |
| 2003/0065687 A1 | 4/2003 | Momiji et al. | |
| 2003/0097640 A1 | 5/2003 | Abrams et al. | |
| 2003/0122874 A1 | 7/2003 | Dieberger et al. | |
| 2003/0126247 A1 | 7/2003 | Strasser et al. | |
| 2003/0131007 A1 | 7/2003 | Schirmer et al. | |
| 2003/0135650 A1 | 7/2003 | Kano et al. | |
| 2003/0137540 A1 | 7/2003 | Klevenz et al. | |
| 2003/0167380 A1 | 9/2003 | Green | |
| 2003/0172937 A1 | 9/2003 | Faries et al. | |
| 2003/0195903 A1 | 10/2003 | Manley et al. | |
| 2003/0220949 A1 | 11/2003 | Witt et al. | |
| 2004/0044707 A1 | 3/2004 | Richard | |
| 2004/0066414 A1 | 4/2004 | Czerwinski et al. | |
| 2004/0073560 A1 | 4/2004 | Edwards | |
| 2004/0078641 A1 | 4/2004 | Fleischmann | |
| 2004/0088331 A1 | 5/2004 | Therrien et al. | |
| 2004/0117459 A1 | 6/2004 | Fry | |
| 2004/0125137 A1 | 7/2004 | Stata et al. | |
| 2004/0133575 A1 | 7/2004 | Farmer et al. | |
| 2004/0139396 A1 | 7/2004 | Gelernter et al. | |
| 2004/0143652 A1 | 7/2004 | Grannan et al. | |
| 2004/0163009 A1 | 8/2004 | Goldstein et al. | |
| 2004/0167942 A1 | 8/2004 | Oshinsky et al. | |
| 2004/0175000 A1 | 9/2004 | Caronni | |
| 2004/0193953 A1 | 9/2004 | Callahan et al. | |
| 2004/0199779 A1 | 10/2004 | Huang | |
| 2004/0199826 A1 | 10/2004 | Bertram et al. | |
| 2004/0210608 A1 | 10/2004 | Lee et al. | |
| 2004/0220965 A1 | 11/2004 | Harville et al. | |
| 2004/0220980 A1 | 11/2004 | Forster | |
| 2004/0228493 A1 | 11/2004 | Ma | |
| 2004/0230892 A1 | 11/2004 | Horton | |
| 2004/0235523 A1 | 11/2004 | Schrire et al. | |
| 2004/0236769 A1 | 11/2004 | Smith et al. | |
| 2004/0236916 A1 | 11/2004 | Berkowitz et al. | |

(56) References Cited

U.S. PATENT DOCUMENTS

| | | |
|---|---|---|
| 2004/0236958 A1 | 11/2004 | Teicher et al. |
| 2004/0267700 A1 | 12/2004 | Dumais et al. |
| 2005/0010955 A1 | 1/2005 | Elia et al. |
| 2005/0071390 A1 | 3/2005 | Midgley et al. |
| 2005/0091596 A1 | 4/2005 | Anthony et al. |
| 2005/0102695 A1 | 5/2005 | Musser |
| 2005/0108253 A1 | 5/2005 | Metsatahti et al. |
| 2005/0138013 A1 | 6/2005 | Walker et al. |
| 2005/0138081 A1 | 6/2005 | Alshab et al. |
| 2005/0144135 A1 | 6/2005 | Juarez et al. |
| 2005/0149577 A1 | 7/2005 | Okada et al. |
| 2005/0165867 A1 | 7/2005 | Barton et al. |
| 2005/0187992 A1 | 8/2005 | Prahlad et al. |
| 2005/0204186 A1 | 9/2005 | Rothman et al. |
| 2005/0216520 A1 | 9/2005 | He et al. |
| 2005/0216527 A1 | 9/2005 | Erlingsson |
| 2005/0246398 A1 | 11/2005 | Barzilai et al. |
| 2005/0262168 A1 | 11/2005 | Helliker et al. |
| 2005/0262377 A1 | 11/2005 | Sim-Tang |
| 2006/0026218 A1 | 2/2006 | Urmston |
| 2006/0041603 A1 | 2/2006 | Paterson et al. |
| 2006/0041823 A1 | 2/2006 | Wolfgang et al. |
| 2006/0053332 A1 | 3/2006 | Uhlmann et al. |
| 2006/0064444 A1 | 3/2006 | Van Ingen et al. |
| 2006/0064634 A1 | 3/2006 | Dettinger et al. |
| 2006/0080521 A1 | 4/2006 | Barr et al. |
| 2006/0085792 A1 | 4/2006 | Traut |
| 2006/0085817 A1 | 4/2006 | Kim et al. |
| 2006/0088167 A1 | 4/2006 | Bade et al. |
| 2006/0101384 A1 | 5/2006 | Sim-Tang et al. |
| 2006/0106893 A1 | 5/2006 | Daniels et al. |
| 2006/0117309 A1 | 6/2006 | Singhal et al. |
| 2006/0137010 A1 | 6/2006 | Kramer et al. |
| 2006/0143250 A1 | 6/2006 | Peterson et al. |
| 2006/0150107 A1 | 7/2006 | Leung et al. |
| 2006/0156246 A1 | 7/2006 | Williams et al. |
| 2006/0161861 A1 | 7/2006 | Holecek et al. |
| 2006/0173848 A1 | 8/2006 | Peterson et al. |
| 2006/0218363 A1 | 9/2006 | Palapudi |
| 2006/0224956 A1 | 10/2006 | Storisteanu et al. |
| 2006/0235907 A1 | 10/2006 | Kathuria et al. |
| 2006/0236406 A1 | 10/2006 | Johnson |
| 2006/0248294 A1 | 11/2006 | Nedved et al. |
| 2006/0253470 A1 | 11/2006 | Friedman et al. |
| 2006/0288205 A1 | 12/2006 | Linares |
| 2007/0027935 A1 | 2/2007 | Haselton et al. |
| 2007/0030528 A1 | 2/2007 | Quaeler et al. |
| 2007/0038884 A1 | 2/2007 | Campbell et al. |
| 2007/0043715 A1 | 2/2007 | Kaushik et al. |
| 2007/0043790 A1 | 2/2007 | Kryger |
| 2007/0070066 A1 | 3/2007 | Bakhash |
| 2007/0078910 A1 | 4/2007 | Bopardikar |
| 2007/0088702 A1 | 4/2007 | Fridella et al. |
| 2007/0094312 A1 | 4/2007 | Sim-Tang |
| 2007/0106978 A1 | 5/2007 | Felts |
| 2007/0136381 A1 | 6/2007 | Cannon et al. |
| 2007/0136389 A1 | 6/2007 | Bergant et al. |
| 2007/0156772 A1 | 7/2007 | Lechner |
| 2007/0168497 A1 | 7/2007 | Locker et al. |
| 2007/0180268 A1 | 8/2007 | Filimon et al. |
| 2007/0185879 A1 | 8/2007 | Roublev et al. |
| 2007/0185922 A1 | 8/2007 | Kapoor et al. |
| 2007/0186127 A1* | 8/2007 | Desai et al. .................. 714/13 |
| 2007/0192386 A1 | 8/2007 | Fries et al. |
| 2007/0266007 A1 | 11/2007 | Arrouye et al. |
| 2007/0271263 A1 | 11/2007 | Merrild |
| 2007/0271303 A1 | 11/2007 | Menendez et al. |
| 2007/0288536 A1 | 12/2007 | Sen et al. |
| 2008/0016576 A1 | 1/2008 | Ueda et al. |
| 2008/0022393 A1 | 1/2008 | Waltermann et al. |
| 2008/0028007 A1 | 1/2008 | Ishii et al. |
| 2008/0033969 A1 | 2/2008 | Koo et al. |
| 2008/0034004 A1 | 2/2008 | Cisler et al. |
| 2008/0034011 A1 | 2/2008 | Cisler et al. |
| 2008/0034016 A1 | 2/2008 | Cisler et al. |
| 2008/0034017 A1 | 2/2008 | Giampaolo et al. |
| 2008/0034019 A1 | 2/2008 | Cisler et al. |
| 2008/0034039 A1 | 2/2008 | Cisler et al. |
| 2008/0046557 A1 | 2/2008 | Cheng |
| 2008/0065663 A1 | 3/2008 | Farlee et al. |
| 2008/0070496 A1 | 3/2008 | Jackson |
| 2008/0077808 A1 | 3/2008 | Teicher et al. |
| 2008/0082578 A1 | 4/2008 | Hogue et al. |
| 2008/0091655 A1 | 4/2008 | Gokhale et al. |
| 2008/0126441 A1 | 5/2008 | Giampaolo et al. |
| 2008/0126442 A1 | 5/2008 | Cisler et al. |
| 2008/0141029 A1 | 6/2008 | Culver |
| 2008/0168184 A1 | 7/2008 | Freedman et al. |
| 2008/0168245 A1 | 7/2008 | De Atley et al. |
| 2008/0168391 A1 | 7/2008 | Robbin et al. |
| 2008/0172607 A1 | 7/2008 | Baer |
| 2008/0177961 A1 | 7/2008 | McSharry et al. |
| 2008/0208630 A1 | 8/2008 | Fors et al. |
| 2008/0214163 A1 | 9/2008 | Onyon et al. |
| 2008/0216011 A1 | 9/2008 | Gould |
| 2008/0222512 A1 | 9/2008 | Albornoz et al. |
| 2008/0229037 A1 | 9/2008 | Bunte et al. |
| 2008/0250342 A1 | 10/2008 | Clark et al. |
| 2008/0285754 A1 | 11/2008 | Kezmann |
| 2008/0307017 A1 | 12/2008 | Lyons et al. |
| 2008/0307018 A1 | 12/2008 | Ulrich et al. |
| 2008/0307019 A1 | 12/2008 | Weiss et al. |
| 2008/0307020 A1 | 12/2008 | Ko et al. |
| 2008/0307175 A1 | 12/2008 | Hart et al. |
| 2008/0307333 A1 | 12/2008 | McInerney et al. |
| 2008/0307347 A1 | 12/2008 | Cisler et al. |
| 2008/0310628 A1 | 12/2008 | Fujioka et al. |
| 2008/0310633 A1 | 12/2008 | Brown et al. |
| 2008/0313243 A1 | 12/2008 | Poston et al. |
| 2009/0019291 A1 | 1/2009 | Murray |
| 2009/0031401 A1 | 1/2009 | Cudich et al. |
| 2009/0052669 A1 | 2/2009 | Ma |
| 2009/0254591 A1 | 10/2009 | Weiss et al. |
| 2009/0307333 A1 | 12/2009 | Welingkar et al. |
| 2010/0017855 A1 | 1/2010 | Johnson et al. |
| 2010/0063960 A1 | 3/2010 | Lehto |
| 2010/0070844 A1 | 3/2010 | Aymeloglu et al. |
| 2010/0169823 A1 | 7/2010 | Audet |
| 2010/0217929 A1 | 8/2010 | Kirshenbaum et al. |
| 2011/0016089 A1 | 1/2011 | Freedman et al. |
| 2011/0083088 A1 | 4/2011 | Cisler et al. |
| 2011/0083098 A1 | 4/2011 | Cisler et al. |
| 2011/0087976 A1 | 4/2011 | Cisler et al. |
| 2011/0202763 A1 | 8/2011 | Martin et al. |
| 2011/0296351 A1 | 12/2011 | Ewing et al. |
| 2011/0302502 A1 | 12/2011 | Hart et al. |
| 2012/0124507 A1 | 5/2012 | Paterson et al. |
| 2012/0185767 A1 | 7/2012 | Schlegel |
| 2012/0198383 A1 | 8/2012 | Cisler et al. |
| 2012/0246565 A1 | 9/2012 | Kumamoto |
| 2012/0272173 A1 | 10/2012 | Grossman et al. |

FOREIGN PATENT DOCUMENTS

| | | |
|---|---|---|
| EP | 1582982 | 10/2005 |
| WO | WO 01/06356 | 1/2001 |
| WO | WO 02/101540 | 12/2002 |
| WO | WO 2005/045756 | 5/2005 |
| WO | 2008/019259 | 2/2008 |
| WO | WO 2008/019237 | 2/2008 |

OTHER PUBLICATIONS

"Aulaclic: Unit 6. The Recycle Bin," Nov. 2005, [Online] [Retrieved on Nov. 26, 2007] Retrieved from the Internet: URL:http://www.teacherclick.com/winxp/t_6_1.htm, pp. 1-2.

Bonwick, "ZFS The Last Word in File Systems," [Online] [Retrieved on Jan. 22, 2008] Retrieved from the Internet: URL:http://opensolaris.org/os/community/zfs/docs/zfs.pdf, 34 pages.

Bonwick et al., "The Zettabyte File System," [Online] [Retrieved on Jan. 22, 2008] Retrieved from the Internet: URL:http://partneradvantage.sun.com/protected/solaris10/adoptionkit/tech/zfs/zfs_overview.pdf, 13 pages.

(56) References Cited

OTHER PUBLICATIONS

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Godfrey, Michael et al., "Using Original Analysis to Detect Merging and Splitting of Source Code Entities," IEEE Transactions on Software Engineering, vol. 31, No. 2. Feb. 2005. pp. 166-181.

Griffiths, "Leopard first looks: Time Machine," Aug. 8, 2006 [Online] [Retrieved on Nov. 23, 2007] Retrieved from the Internet: URL:http://www.macworld.com/2006/08/firstlooks/leotimemac/index.php?pf=1, pp. 1-2.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

In-link files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/ln.html, 5 pages.

Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.

Microsoft-TechNet, "Using Encrypting File System," Nov. 3, 2005, Microsoft, 40 pages.

"MSDN Academic Alliance Developer Center, Curriculum Repository Glossary," [Online] [Retrieved on Apr. 22, 2009] Retrieved from the Internet URL: http://www.academicresourcecenter.net/curriculum/glossary.aspx, 4 pages.

Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.

"StorageSync: Backup, Restore, & Synchronization Software User's Guide", SimpleTech, 2003, 100 pages.

Sun Microsystems, Inc., "ZFS On-Disk Specification," Draft: Dec. 9, 2005, [Online] [Retrieved on Jan. 22, 2008]; Retrieved from the Internet URL: http://opensolaris.org/os/community/zfs/docs/ondiskformat0822.pdf,, 55 pages.

Tittel, "An EAZ Way to Restore Crippled and Inoperable Systems," ChannelWeb, Apr. 25, 2005, [Online] [Retrieved on Aug. 13, 2008] Retrieved from the Internet URL: http://www.crn.com/white-box/161502165, 10 pages.

"What's New in Word 2002," Wellesly College Information Services Computing Documentation, Jan. 2002, [Online] Retrieved on Aug. 14, 2008] Retrieved from the Internet URL: http://www.wellesley.edu/Computing/Office02/Word02/word02.html, 19 pages.

Extended European Search Report and Written Opinion, uropean Application No. 11171738.5, Aug. 29, 2011, 5 pages. (114EP2).

International Search Report and Written Opinion, PCT/US2007/074729, Jul. 12, 2007, 11 pages. (043WO1).

International Search Report and Written Opinion, PCT/US2007/074881, Jul. 12, 2007, 11 pages. (128WO1).

International Search Report and Written Opinion, PCT/US2007/074653, Aug. 14, 2008, 14 pages. (040WO1).

International Search Report and Written Opinion, PCT/US2008/065146, Oct. 31, 2008, 21 pages. (111WO1).

International Search Report and Written Opinion, PCT/US2008/066212, Mar. 9, 2009, 26 pages. (114WO1).

International Search Report and Written Opinion, PCT/US2007/074863 Apr. 21, 2009, 20 pages. (044WO1).

European, Communication pursuant to Article 94(3) EPC for Application No. EP 07 799 899.5, dated May 14, 2009, 2 pages. (0040EP1).

European, Communication pursuant to Article 94(3) EPC for Application No. EP 07 813 540.7, dated Jun. 23, 2009, 2 pages. (0043EP1).

European, Communication pursuant to Article 94(3) EPC for Application No. EP 07 799 899.5, dated Oct. 7, 2009, 4 pages. (0040EP1).

Examination Report from European Application No. 07 813 605.8 dated Oct. 27, 2011, 5 pages. (128EP1).

Examination Report from European Application No. 07 813 540.7 dated Oct. 27, 2011, 5 pages. (043EP1).

Extended European Search Report, European Application No. 11184579.8, Nov. 17, 2011, 6 pages. (0111EP2).

Office Action dated Feb. 29, 2012 from related Chinese Application No. 200880024710.0, 11 pages. (0111CN1).

Chen et al., "Data Redundancy and Compression Methods for a Disk-based Network Backup System", 2004, IEEE, pp. 1-8.

Charles Rubin, Mary Millhollon and Katherine Murray, "Microsoft Office Word 2003, Official Manual", First Edition, Japan, Nikkei BP Softpress, Jul. 12, 2004, vol. 1, p. 300, 815-818.

Wang et al., "A Secure and Efficient Desktop Backup and Recovery System", 2007, IEEE, pp. 304-309.

Microsoft Corporation, "Description of the AutoRecover Functions in Excel," [online] Microsoft Corporation, Aug. 10, 2007, Article ID 289273; URL: http://support.microsoft.com/kb/289273/en-us; retrieve Nov. 27, 2013.

Anonymous, "ForeverSave Version 1.1.3", Published Jan. 1, 2009, 16 pgs [online]. Retrieved from the Internet: <URL: http://tool-forcesw.com/docs/ForeverSave_Manual.pdf>.

* cited by examiner

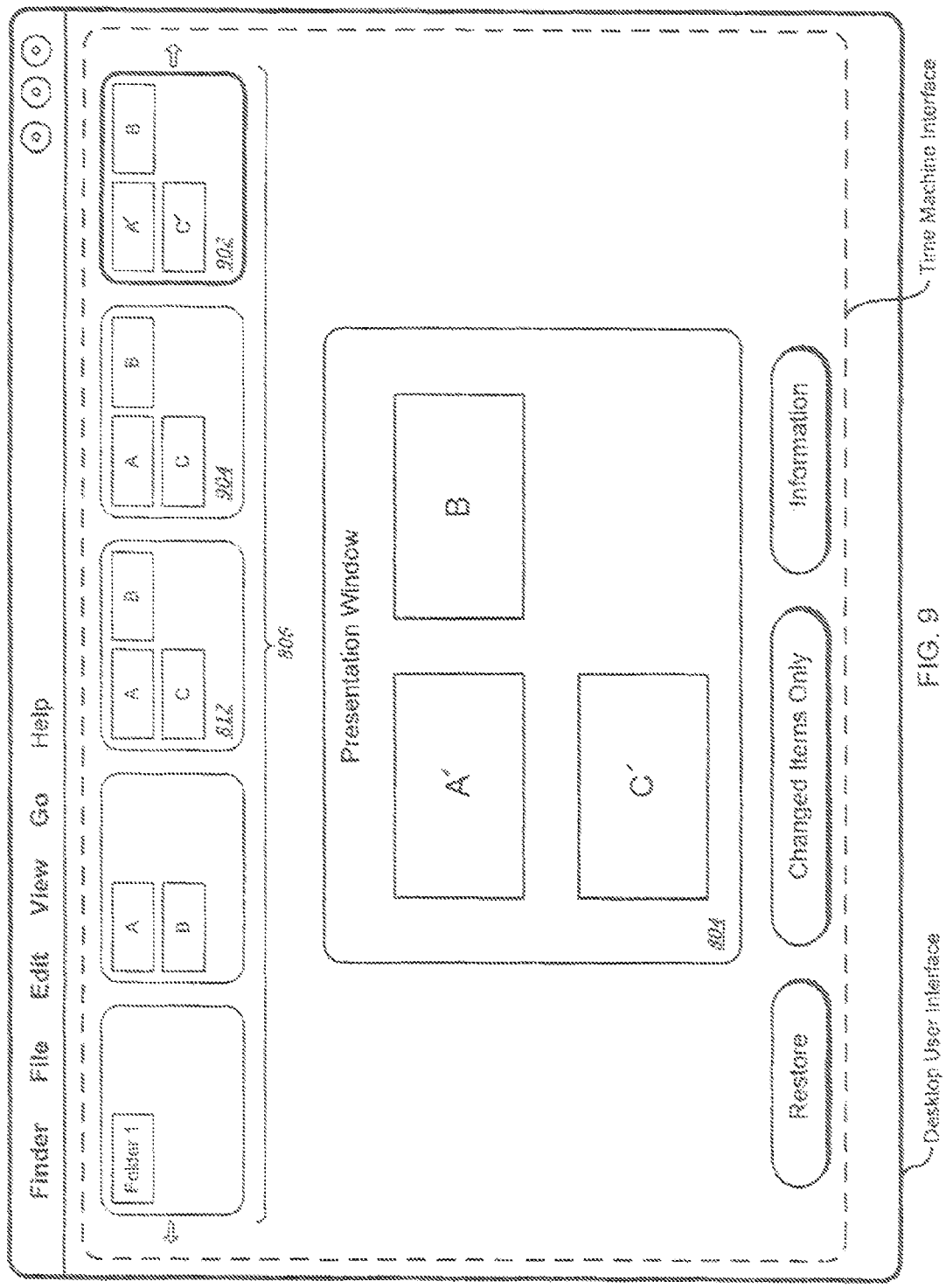

CONSISTENT BACKUP OF ELECTRONIC INFORMATION

RELATED APPLICATIONS

This application is a continuation of and claims priority to U.S. application Ser. No. 11/499,256, filed Aug. 4, 2006, the entire disclosure of which is incorporated herein by reference.

This application is generally related to the following jointly owned and co-pending patent applications, each incorporated herein by reference in its entirety:

U.S. patent application Ser. No. 11/499,839, now U.S. Pat. No. 7,809,688, for "Managing Backup of Content," filed Aug. 4, 2006;

U.S. patent application Ser. No. 11/499,881, now U.S. Pat. No. 7,856,424, for "User Interface for Backup Management," filed Aug. 4, 2006;

U.S. patent application Ser. No. 11/499,879, now U.S. Pat. No. 7,853,566, for "Navigation of Electronic Backups," filed Aug. 4, 2006;

U.S. patent application Ser. No. 11/499,880, now abandoned, for "Architecture for Back Up and/or Recovery of Electronic Data," filed Aug. 4, 2006;

U.S. patent application Ser. No. 11/499,385, now U.S. Pat. No. 7,809,687, for "Searching a Backup Archive," filed Aug. 4, 2006;

U.S. patent application Ser. No. 11/499,250, now U.S. Pat. No. 7,860,839, for "Application-Based Backup-Restore of Electronic Information," filed Aug. 4, 2006;

U.S. patent application Ser. No. 11/499,840, for "System for Multi-Device Electronic Backup," filed Aug. 4, 2006;

U.S. patent application Ser. No. 11/499,848, for "System for Electronic Backup," filed Aug. 4, 2006;

U.S. patent application Ser. No. 11/499,867, for "Restoring Electronic Information," filed Aug. 4, 2006;

U.S. patent application Ser. No. 11/499,386, for "Links to a Common Item in a Data Structure," filed Aug. 4, 2006;

U.S. patent application Ser. No. 11/499,866, for "Event Notification Management," filed Aug. 4, 2006;

U.S. patent application Ser. No. 11/499,885, now U.S. Pat. No. 7,853,567, for "Conflict Resolution in Recovery of Electronic Data," filed Aug. 4, 2006.

TECHNICAL FIELD

The disclosed implementations relate generally to storing and restoring data.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save its current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file back as it was once before. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it can not be possible to automatically undo any previous edits.

SUMMARY

Systems and methods are provided for performing backup operations (e.g., using a backup daemon) while a user is using a device. An algorithm or other monitoring can be used to detect changes that occur during the backup operation in order to maintain consistency between related data in the backup. The back up can be performed again for related data that was modified during prior backup operation.

In general, in one aspect, a method is provided. A backup operation of data including a plurality of related items is initiated. Modifications to one or more items of the plurality of related items are monitored for during the backup operation. The backup operation is completed. If a modification occurred to one or more items, a second backup operation is performed for the modified items.

Implementations of the method can include one or more of the following features. The method can further include determining which items of data are related. The monitoring for modifications can include identifying event notifications associated with an item of the plurality of related items. Performing a second backup operation can include replacing the backup data for an item with backup data from the second backup. The method can further include monitoring for modifications to one or more items of the plurality of related items during the second backup operation. The method can further include determining a maximum number of backup operations to perform to complete a backup operation without modifications occurring during the backup operations. If the maximum number of backup operations is reached, an alert can be generated including notifying a user. If the maximum number of backup operations is reached, the backup operation can be suspended for a predefined period of time.

In general, in one aspect, a method is provided. A criterion for capturing a state of a view of a user interface is defined. The state of the view is captured in accordance with the criterion. Capturing the state includes monitoring for modification of the state of the view during the capture and performing a second capture for the modification of the state of the view. A prompt is received to suspend presentation of a current view and present a captured view. The captured view is reinstated into the current view of the user interface.

Particular embodiments of the subject matter described in this specification can be implemented to realize one or more of the following advantages. Changes to data being included in a backup operation can be detected. If changes are detected, additional backup operations can be performed in order to prevent inconsistent data in a backup, particularly related data.

The details of the various aspects of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 9 is a screen shot depicting another example of a time machine user interface after the time machine engine has been activated.

DETAILED DESCRIPTION

Figure 1:
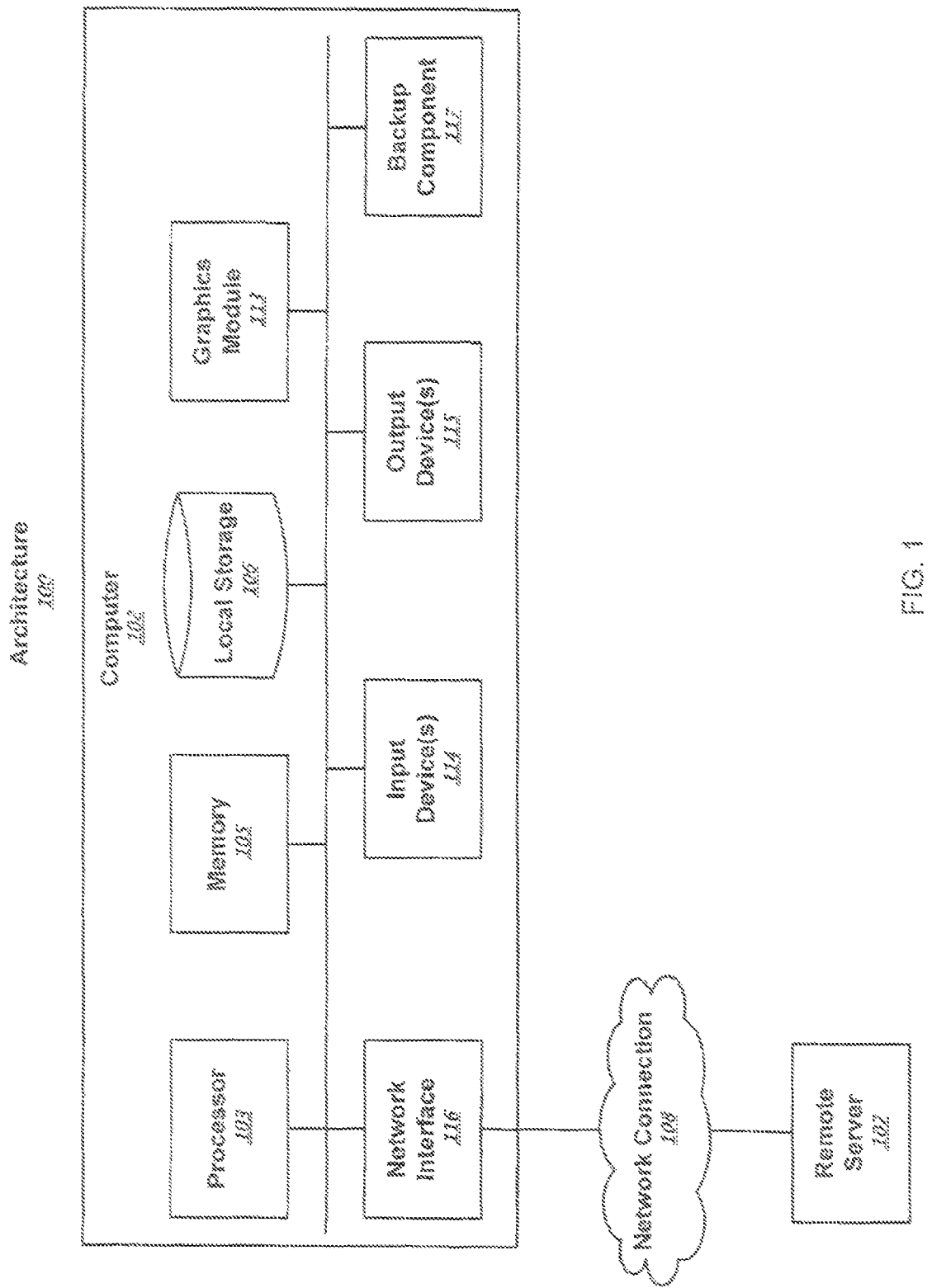
FIG. 1 is a block diagram of an example of an architecture for modifying a user interface view in a display environment.

FIG. 1 is a block diagram of an architecture 100 (e.g., a hardware architecture) for capturing at least one earlier version of a user interface view and allowing a user to initiate a restoration based on it. As used herein, a view refers to an item, element or other content, capable of being presented in a user interface, that can be subjected to a backup operation by the backup component 117. For example, a user interface view can contain any number of icons, files, folders, application state information and/or machine state information, etc. The architecture 100 includes a personal computer 102 communicatively coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115. Architecture 100 as disclosed includes various hardware elements. Architecture 100 can include hardware, software, and combinations of the two.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for modifying an interface view (e.g., a user interface view). Systems and method are also provided for performing consistent backup operations while data on a device is being modified. The systems and methods can be stand alone, or otherwise integrated into a more comprehensive application. In the materials presented below, an integrated system and method for modifying a user interface view is disclosed. As used herein, a view refers to an item, element or other content, capable of being presented in a user interface, that can be subjected to a backup operation by the backup component 117.

Though discussion is made with reference to modifying a user interface view, those of ordinary skill will recognize that such a view can be based on various data structures, files, processes, and other aspects of information management. It follows that modification to file structures, data and the like is also contemplated in order to achieve the modification to the user interface view. In other words, while the restoration of the user interface view from one state to another can be the most apparent change from the user's perspective, this is accomplished through the corresponding changes in the underlying system content.

One of ordinary skill in the art will recognize that the engines, methods, processes and the like that are described can themselves be an individual process or application, part of an operating system, a plug-in, an application or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items, for example within the local storage 106 or in an external storage repository. In one implementation, the backup component 117 also allows a user to select any of the stored versions and use it to initiate a restoration of that version in the computer.

Figure 2:
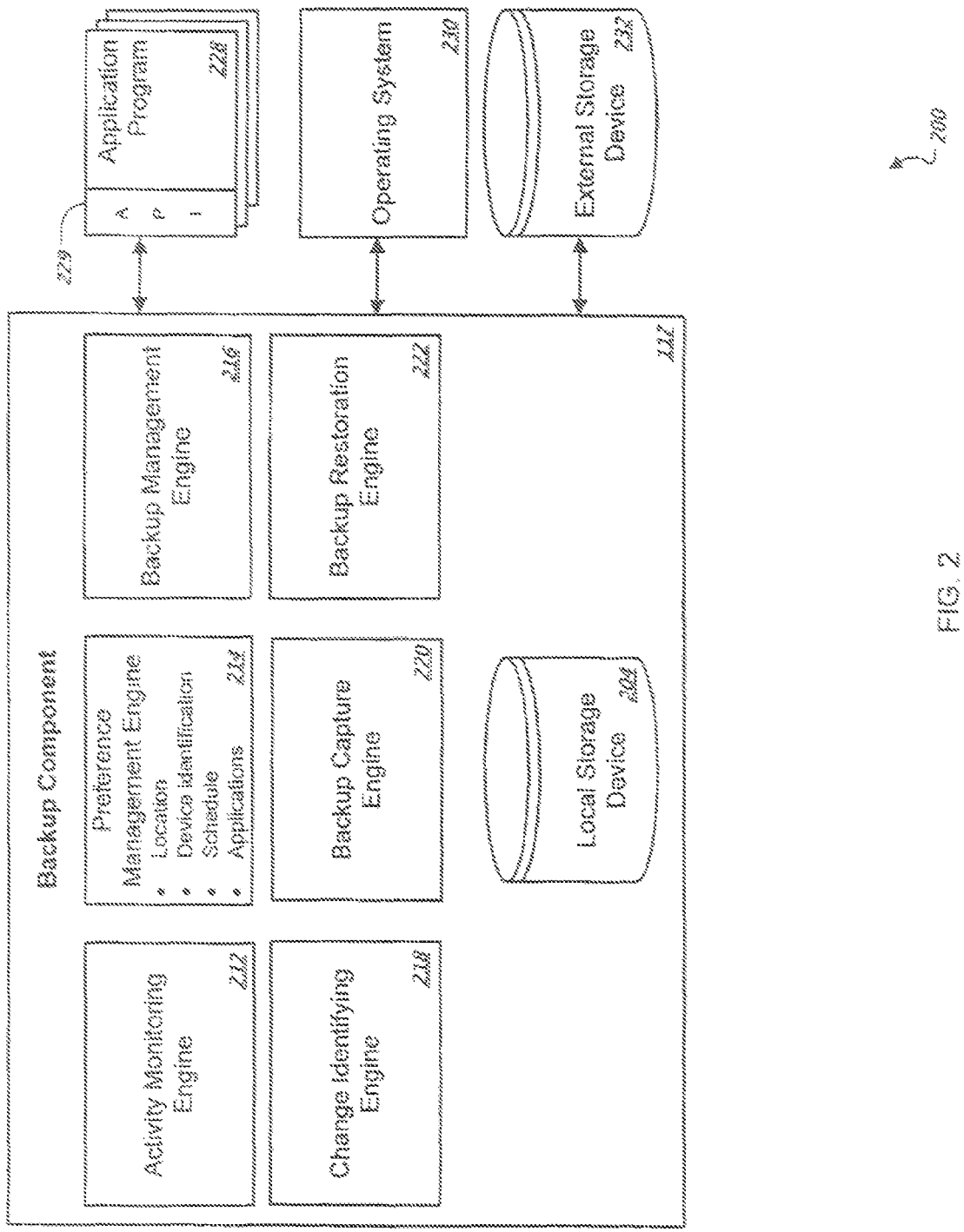
FIG. 2 is a block diagram of an example of an architecture for backing up and restoring.

FIG. 2 is a block diagram of an exemplary architecture (e.g., software architecture) 200 for enabling the back up and restoration of elements of items such as, application files, for example, those associated with a set of application programs 228.

Each application program 228 can include an application programming interface (API) 229. The architecture 200 can utilize API 229 techniques to access application programs and enhance them with further functionality. For example, the API 229 can link several applications together for providing a single service on all linked applications. Particularly, the time machine architecture can utilize API techniques to enhance application programs with the time machine functionality. The API tools can link several applications to the time machine engine by using an API for providing a similar menu or icon for each application. For example, the API can be used by the time machine when generating a backup version of a current state of the application. As another example, the API can be used when the application is restored, through the time machine, to a state that corresponds to a backup version. Although the API 229 is shown in FIG. 2 as part of application programs 228, the API can be separate from the application programs 228. For example, the API 229 can be separately located and made available by the system for use by one or more of the application programs 228.

In one implementation, the backup component 117 provides back up and restoration capability for the system. Many different items or elements can be the subject of a back up in the system. For example, folders, files, items, information portions, directories, images, system parameters, playlists, address books, e-mails, e-mail folders, application states and the like all can be candidates for archiving. Other types are also possible. In this example, the backup component 117 includes a local storage device 204 and an external storage device 232. Versions can be stored on either of them. Any number of local and/or external storage devices can be used by the backup component 117 for storing versions. In one implementation, no local storage is provided.

In one implementation, one copy of original data (e.g., folders, files, items, information portions, directories, images, system parameters, playlists, address books, e-mails, e-mail folders, application states, preferences, and the like) is stored in the system in addition to the original. When one or more subsequent copies are made, each one can contain only the differences between the current data version and the original data version, thereby saving storage space. In some implementations, the storage devices 204 and 232 can be used to store the original versions of the data as well as links pointing to the original versions. The links can be hard links which reference, or point to, physical data, or as another example can be symbolic links that reference another file on the storage device (e.g., by name or location).

The backup component 117 can interact with one or more of the applications using the corresponding API. In one implementation, this can provide backing up of that application's files, state or other items, and can provide for user restoration of a selected backed up version, to name two examples. In one implementation, the backup component 117 runs as a background task on an operating system 230, where the task is not visible to the user. The backup component 117 can be capable of running across multiple user accounts.

The backup component 117 includes an activity monitoring engine 212. In one implementation, the activity monitoring engine 212 monitors for changes within applications (e.g., application files or state) that are targeted for backup operations. A change can also include the addition of new files or other data structures, or deletion of existing ones. For example, the activity management engine 212 can be responsible for verifying the integrity of a playlist in a music file management program, or for verifying that a corresponding song file exists for a listed song.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through its interaction with the application programs 228. The activity monitoring engine 212 can, for example, create a list of modified elements to be used when a backup event is eventually triggered. In one implementation, the activity monitoring engine 212 can monitor the system for periods of inactivity. The activity monitoring engine 212 can then trigger a backup event during a period of time in which the backup operation will not cause a system slowdown for an active user.

A preference management engine 214 specifies some operating parameters of the backup component 117. In one implementation, preference management engine 214 contains user-specified and/or system default application parameters for the backup component 117. These can include settings for the details of capturing and storing the views. For example, the preference management engine 214 can determine the frequency of a backup capture, the storage location for the backup versions, the types of elements (e.g., files or other items) that are eligible for backup capture, and the events which trigger a backup capture (periodic or event-driven, etc.).

In one implementation, the preference management engine 214 can detect that a new storage device is being added to the system and prompt the user whether it should be included as a backup repository. Files and other items can be scheduled for a backup operation due to location (e.g. everything on the C: drive and within D:/photos), a correlation with specific applications (e.g. all pictures, music, e-mail in an inbox, an address book, and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of views performed by the backup component 117. For example, the backup management engine 216 can trigger the activity monitoring engine 212 to watch for activities that satisfy a requirement specified in the preference management engine 214.

A change identifying engine 218 locates specific files or other items within to determine if they have changed. The change identifying engine 218 can be capable of discerning a substantive change from a non-substantive change. For example, the change identifying engine 218 can identify a loss of data associated with a user's current view. In one implementation, the change identifying engine 218 traverses a target set of files or other items, comparing a previous version to the current version to determine whether or not a modification has occurred. In addition, the change identifying engine 218 can generate an alert identifying the loss of data, and prompt the user to initiate a previous version of the current view to restore the lost data. For example, the change identifying engine 218 can be responsible for verifying whether a data loss has occurred in a music file management program, or for verifying that a corresponding song file is unchanged for a listed song.

A backup capture engine 220 locates views (e.g., elements, files or other items) that are to be backed up. The backup capture engine 220 can invoke the activity monitoring engine 212 and/or the change identifying engine 218, for example, to generate a capture list. The backup capture engine 220 can then store copies of these elements in one or more targeted storage repositories. The backup capture engine 220 can track multiple version copies of each item included in the backup repository.

The backup component 117 includes a backup restoration engine 222 to restore previous versions of views (e.g., files or other items). In one implementation, the backup restoration engine 222 provides a user interface (e.g., a graphical user interface) where a user can select the item(s) to be restored.

The backup restoration engine 222 can initiate data backup operations on one or more data elements or items as directed by a user, the system, or according to a predetermined or otherwise defined schedule. For example, the user can set up a scheduled backup operation to occur for any number of data files. The data files can be related to one another, such as when the files share similar attributes or a schema. For example, several files included on one particular webpage can have a similar schema and can require versions of each related file to remain consistent to display a successful webpage image. Unless the backup operation is completed in a very short amount of time, there is a chance that one or more of the files to be included in the backup can be modified before the backup operation is complete. For example, the backup operation can be performed while a computer system is in use (e.g., executing operation received from a user). The use of the computer system during a backup operation can introduce inconsistencies between backed up data files and data files currently awaiting the backup operation. In this example, such changes are monitored and the backup operation can be tailored to take them into account. If inconsistencies are found between files, the backup restoration engine 222 can attempt to resolve any discrepancies between data files.

Figure 3:
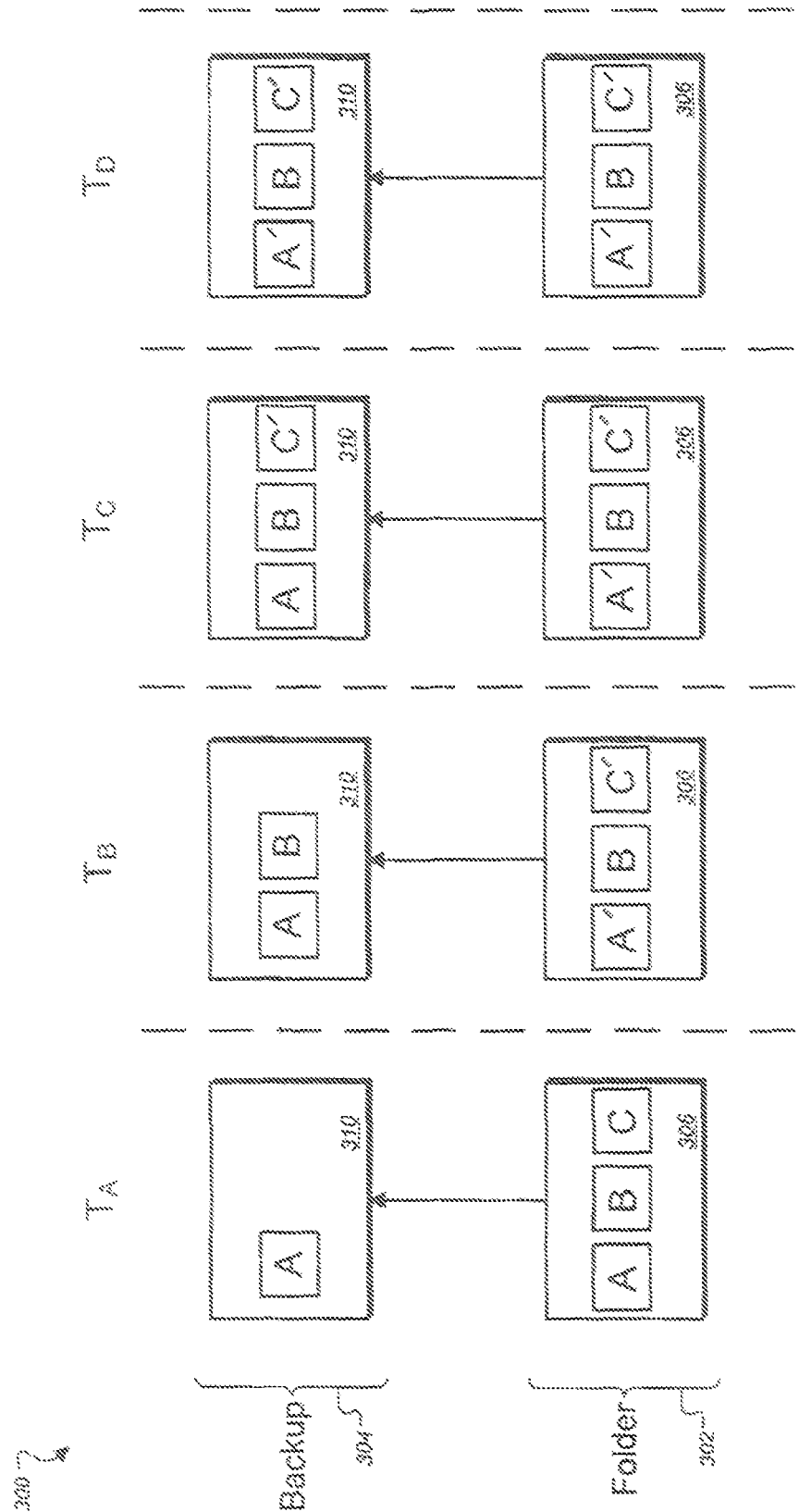
FIG. 3 is a block diagram depicting a data backup operation.

FIG. 3 is a block diagram 300 schematically depicting a data backup operation. The block diagram 300 schematically shows a folder 302 and a backup 304. The folder 302 can include several files or other items. For example, when the backup operation is initiated, a folder 306 includes file A, file B, and file C. The system monitors any changes in the files/items while a backup operation is being performed.

The backup 304 can over time include copies of files, such as file A, file B, or file C, as they are backed up. Files stored in the backup folder 304 can be exact copies of the original folder 102 contents, or a modified portion thereof. As shown in FIG. 3, the backup component 117 has been instructed to back up the files A, B and C included in the folder 306. At time $T_A$, a backup operation has been initiated and begins to backup files. For example, the backup operation has successfully backed up file A in a backup folder 310. At time $T_B$ thereafter, the user makes a modification to file A in folder 306, thus changing the file A to file A'. In this description, when a user modifies a file during the backup operation, the file name is modified to include an inversion mark, or a prime mark (e.g., modifications to file A are notated as file A'). Similarly, the user at time $T_B$ changes the file C to C'. File A has been successfully backed up at time $T_A$, and the new modification can create an inconsistency in the data.

At time $T_B$, file B is successfully backed up to backup folder 310. The time machine engine can continue to backup data at time $T_C$ adding file C' from folder 306 to folder 310. Upon nearing the end of the group of files to back up, the time machine engine can now resolve the inconsistency at time $T_D$. At $T_D$, the backup folder 310 is modified based on a change that was detected during the back up. Particularly, the backed up file A is replaced with the file A'. This backup modification operation was triggered by detecting the change between the original file A and the new file A'. Thus, if the folder 310 is used in a restoration operation in the future, it will restore the files A', B and C' to the system, rather than the files A, B, and C' which was the state of the backup folder at $T_C$. Thus, the change in the backup folder at $T_D$ seeks to give that folder the state that the folder 306 had when the backup was completed at $T_C$.

In some implementations, the time machine engine can determine that particular files are related to one another. In the example in FIG. 3, the user can have set the time machine engine to resolve changes in related files before completion of the first backup. In such implementations, the subsequent modification of the backup folder is done only if there is a change in a related file. Here, changing file A to file A' can alter a link or shared relationship to file B. For example, when file A changes to file A', the time machine engine can modify an associated link or relationship within file A to allow the correlation between file A (now modified to file A') and file B to remain intact. In some implementations, a user can define files as being related through a predefined relationship between the original files or file structures. In some implementations, the user can receive an alert or message stating that the inconsistency has been found, and further, can be prompted to make a decision about performing another backup operation. In other implementations, the backup process can not attempt to determine a relationship between files.

In some implementations, a backup operation can begin automatically when the backup management engine 216 is invoked to compare data captured by the backup capture engine 220 with data identified in the change identifying engine 218. For example, when the user modifies a previously backed up file, the backup management engine 216 can be invoked to begin the comparison of data. If changed data has been identified, the change identifying engine 218 informs the backup management engine 216 that a change has occurred. Next, the backup management engine 216 can query the preference management engine 214 to determine whether or not to attempt an additional backup operation for the modified files. The preference management engine 214 can inform the backup management engine 216 of any predetermined preferences and an additional backup operation can ensue.

Upon initiating each backup operation, the time machine engine can begin monitoring for additional modifications (e.g., using an event monitor or detector such as FS Events which monitors file system changes). If additional modifications to the data identified as part of the backup operation (e.g., an incremental backup of particular changed files) occur during the time of the backup operation are detected, the time machine engine can attempt to resolve each conflict. In one implementation, any changes to data other than the data being included in the backup will not impact the backup data and will be captured during the next backup operation. Moreover, while the post-backup modification of the backup folder is being done, the system can monitor for additional changes in any of the files involved. If such additional changes are found, the system can perform an additional modification of the backup folder. In some implementations, the user can predetermine a maximum number of such iterations to perform. Upon completing the maximum number of backup operations, the time machine engine can inform the user that a maximum number of backup operations has completed, and further backups can not be performed on the current data. In other implementations, the iterative updates of the backup folder can continue until no further changes of the files at issue are detected.

In an alternative implementation, a notification system provides notifications to the time machine engine when a change is detected. For example, an event notification system can provide a notification when a change to one of the files in the backup operation is detected (e.g., using event detector such as FS Events). For example, if a file in the backup is written to during the backup operation, the change can be logged by an event detector. The event detector can then notify the time machine engine that the file has been written to.

In some implementations, the time machine engine can detect modifications occurring to previously backed up data and ignore the conflict the modified data can create. For example, the user can set the time machine engine to never resolve backup conflicts and therefore the time machine engine stores elements in the version that is available to the system. Specifically, modified files are stored in their modified state if the backup operation occurred after the modification.

In some implementations, a modification can be ignored because the change is insignificant. For example, a file attribute modification, such as which particular user opened the file most recently can be ignored because it is not significant to the file content. In some implementations, a modification can be ignored because the change creates a conflict in the system. For example, the system can ignore all modifications and back up an original version of elements corresponding to the state when the backup process began. These determinations can be made by the change identifying engine 218.

When the time machine engine determines that a change has occurred during a backup operation, several options can be presented to the user during or after the initial backup operation. In the example above, the time machine modified an initial backup file to restore a file relationship between the files. In some implementations, the time machine engine can automatically resolve the changed file inconsistencies (replace data) until a maximum number of iterations occurs, in which case the user can be prompted to make a decision regarding subsequent backup operations. In some implementations, the time machine engine can notify the user each time a change has occurred during a backup operation. If modifications to backup data cannot be resolved because the user is modifying too many files during the backup operation, the time machine engine can attempt to resolve the data when the computer system is not in use.

Figure 4:
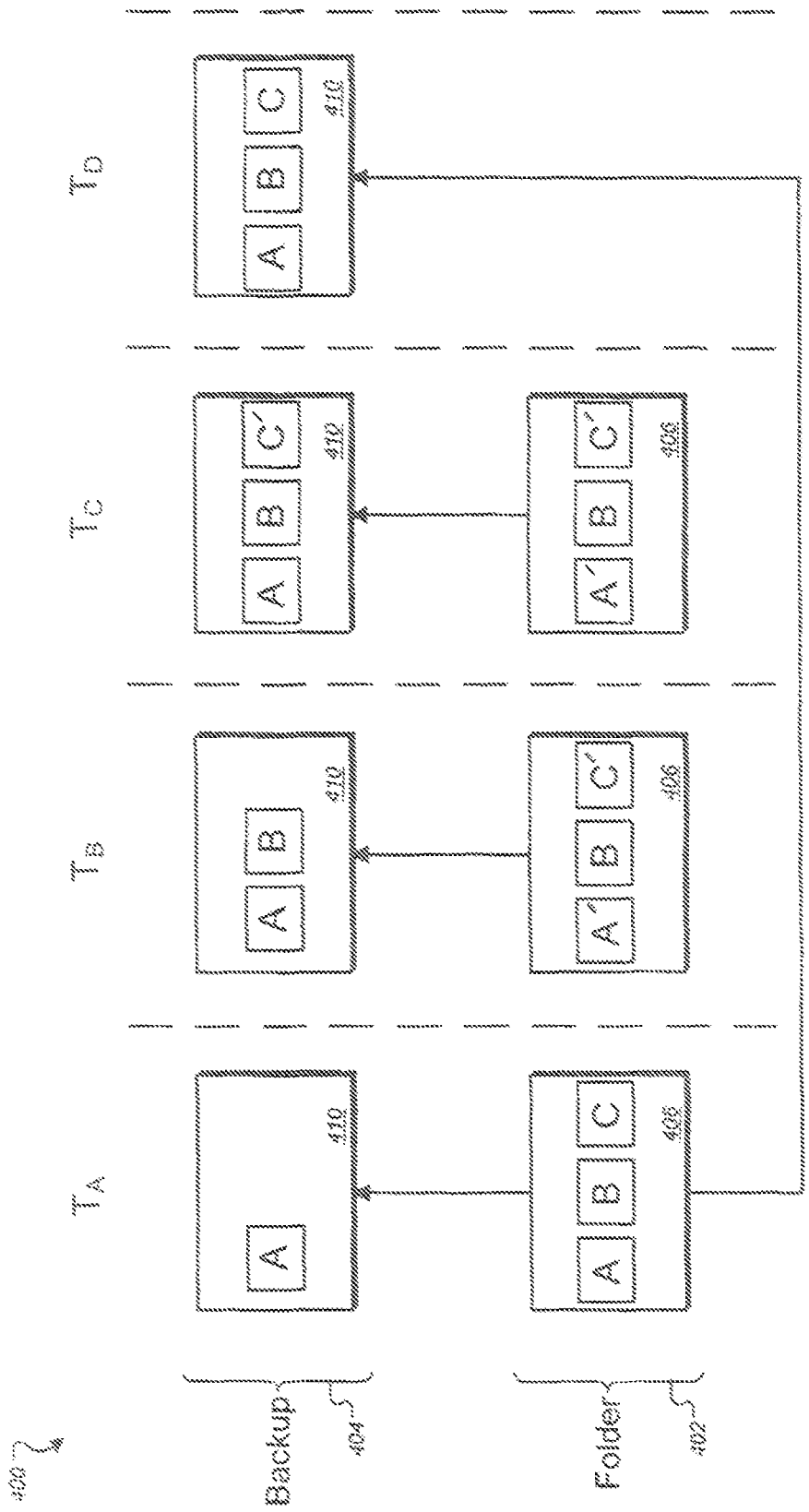
FIG. 4 is a block diagram depicting another data backup operation.

FIG. 4 is a block diagram depicting another data backup operation. In contrast to the example in FIG. 3, the system here will, upon detecting a change made during the backup process, modify the backup folder to correspond to the state when the backup process began. The block diagram 400 schematically shows a folder 402 and a backup 404. The folder 402 can include several files in a computer system. Similar to the example described with respect to FIG. 3, a folder 406 includes file A, file B, and file C when the backup operation is initiated. As described earlier, the backup 404 (in analogy to the backup 304) can over time include copies of files, such as file A, file B, or file C, as they are backed up. As shown in FIG. 4, the backup component 117 (FIG. 1) has been instructed to back up the files A, B and C included in the folder 406. At time $T_A$, a backup has been initiated and begins to backup files. For example, the backup operation has successfully backed up file A in a backup folder 410. At time $T_B$ thereafter, the user makes a modification to file A in folder 406, thus changing the file A to file A'. Similarly, the user at time $T_B$ changes the file C to C'. At time $T_B$, file B is successfully backed up to backup folder 410. The time machine engine can continue to backup data at time $T_C$ adding file C' from folder 406 to folder 410.

Upon nearing the end of the group of files to back up, the time machine engine can now resolve the inconsistency at time $T_D$. In the example in FIG. 3, the time machine engine attempted to resolve the conflict by performing subsequent backup operations to capture modifications to each file. Here, the time machine engine will deliberately ignore, at least for the time being, the modifications made to one or all of the files. At $T_D$, the backup folder 410 is modified using the version of each file when the backup operation was initiated. Particularly, the already backed up file C' in the backup 404 is replaced with the file C that existed when the backup operation was initiated. This backup operation was triggered by detecting that a change between the original file C and the new file C' occurred after the backup operation had begun. Thus, the change in the backup folder at $T_D$ seeks to give that folder the state that the folder 302 had when the backup operation was initiated. The current state of the folder 402, A' B C', can be backed up in a subsequent backup procedure.

In some implementations, the time machine engine can trigger another backup operation because a file modification was detected to one file, but not others. For example, modifying files that are related can introduce a conflict because related files can require a specific hierarchy or formatting to function properly in the computer system 102. The time machine engine can monitor file changes and check for any relatedness to other files in the system. Thus, modifying one file and not its related counterparts can trigger one or more future backup operations.

Figure 5:
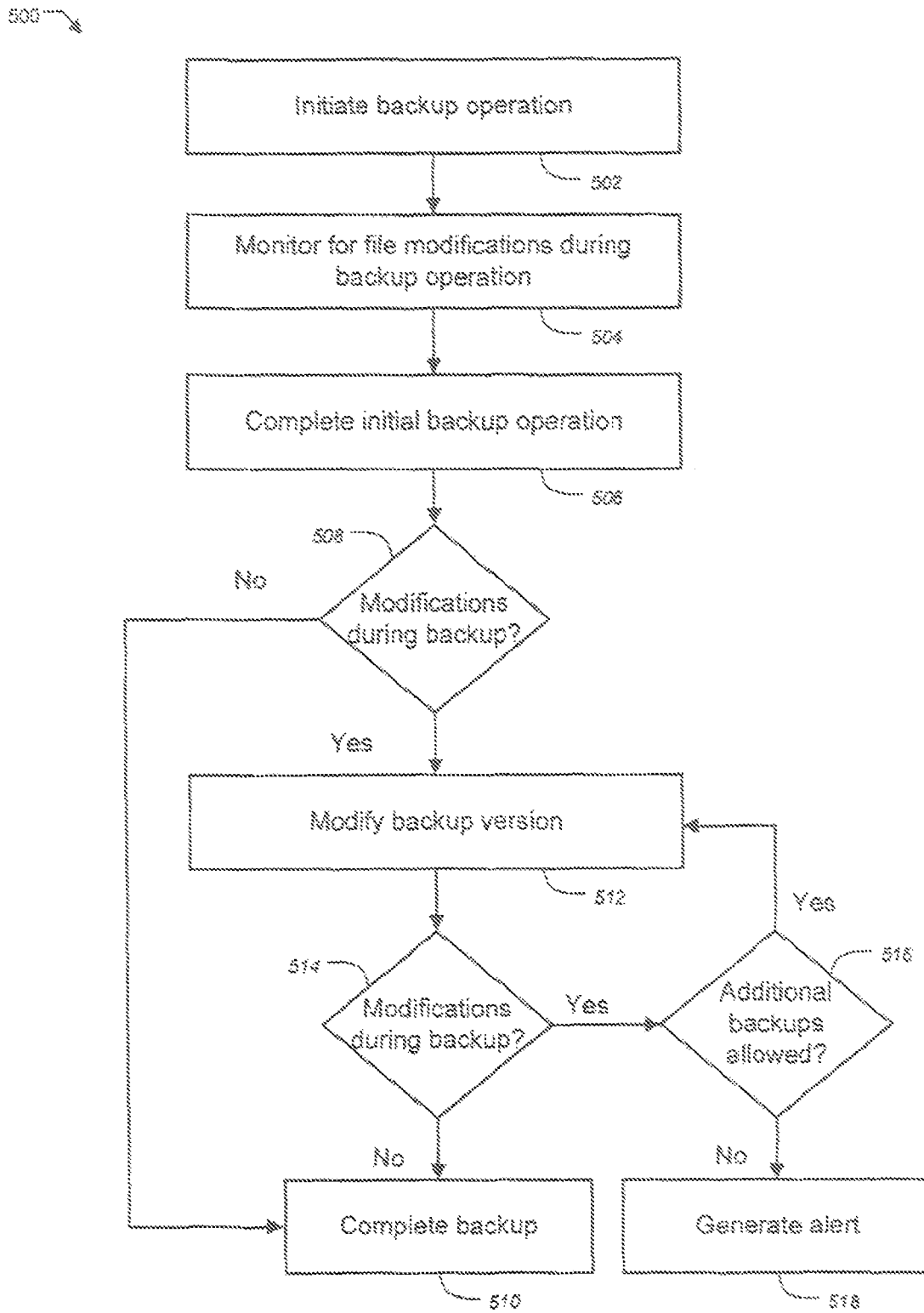
FIG. 5 is a flow chart of exemplary operations that can be performed in a backup procedure.

FIG. 5 is a flow chart of exemplary operations 500 that can be performed to backup elements or items, such as data files and folders. The operations 500 can be performed by a processor executing instructions stored in a computer program product. The operations 500 begin in step 502 with initiating a backup operation of data. For example, a user can choose to back up files or folders on a particular time schedule, and the time machine engine can begin the backup operation according to the time schedule. In step 504, the operations comprise monitoring for file modification to one or more items of the related items during the backup operation. For example, the time machine engine can monitor file changes made by a user and determine whether or not the modifications cause an inconsistency between related items. In some implementations, the time machine engine can initially ignore modifications that have been made to related files, and back up the original files before determining whether or not the modifications cause an inconsistency in the files. The initial backup operation is completed in step 506.

The time machine engine monitors, in step 508, modifications that can occur during the backup operation. A query can be sent to a processing device, such as the backup management engine 216, for example, to determine whether or not modifications occurred during a particular backup operation. If modifications did not occur during the backup operation, the backup can be determined complete, in step 510. If modifications did occur, the time machine engine can modify a backup version, in step 512. In one implementation, the backup version is modified to correspond to the state that the files (or other items) have at the end of the initial backup operation, for example as described with reference to FIG. 3. In another implementation, the backup version is modified to correspond to the state that the files (or other items) have at the beginning of their initial backup operation, for example as described with reference to FIG. 4. In some implementations, the user can be given a prompt or an option to decline further backup operations. For example, when a modification is insignificant to the structure and content of the files (e.g., a title change or file name change), the time machine engine can present a pop-up window containing a decline or ignore option. Upon completion of the backup operation, in step 514, it can be determined whether or not modifications have occurred during the backup operation. If modifications did not occur during the backup operation, the backup can be determined complete, in step 510. When modifications have occurred during a backup operation, a query can be sent to determine whether or not additional backup operations can be allowed, in step 516. For example, a user can set a maximum number of backup operations that can be carried out by configuring the time machine engine with a predetermined number of iterations. If further backup operations are allowed, the back up can be performed again to resolve the inconsistencies, in step 512. The time machine engine can attempt to resolve inconsistencies by performing steps 512, 514, and 516 until the maximum number of iterations has been reached. Upon reaching the maximum number of backup operations, the time machine engine can generate an alert to the user, in step 518. The alert can notify the user of the intended resolution and can allow the user to decline, continue, or modify the backup operation. In some implementations, the user can choose to be prompted each time the time machine engine triggers the performance of the backup operation.

Figure 6:
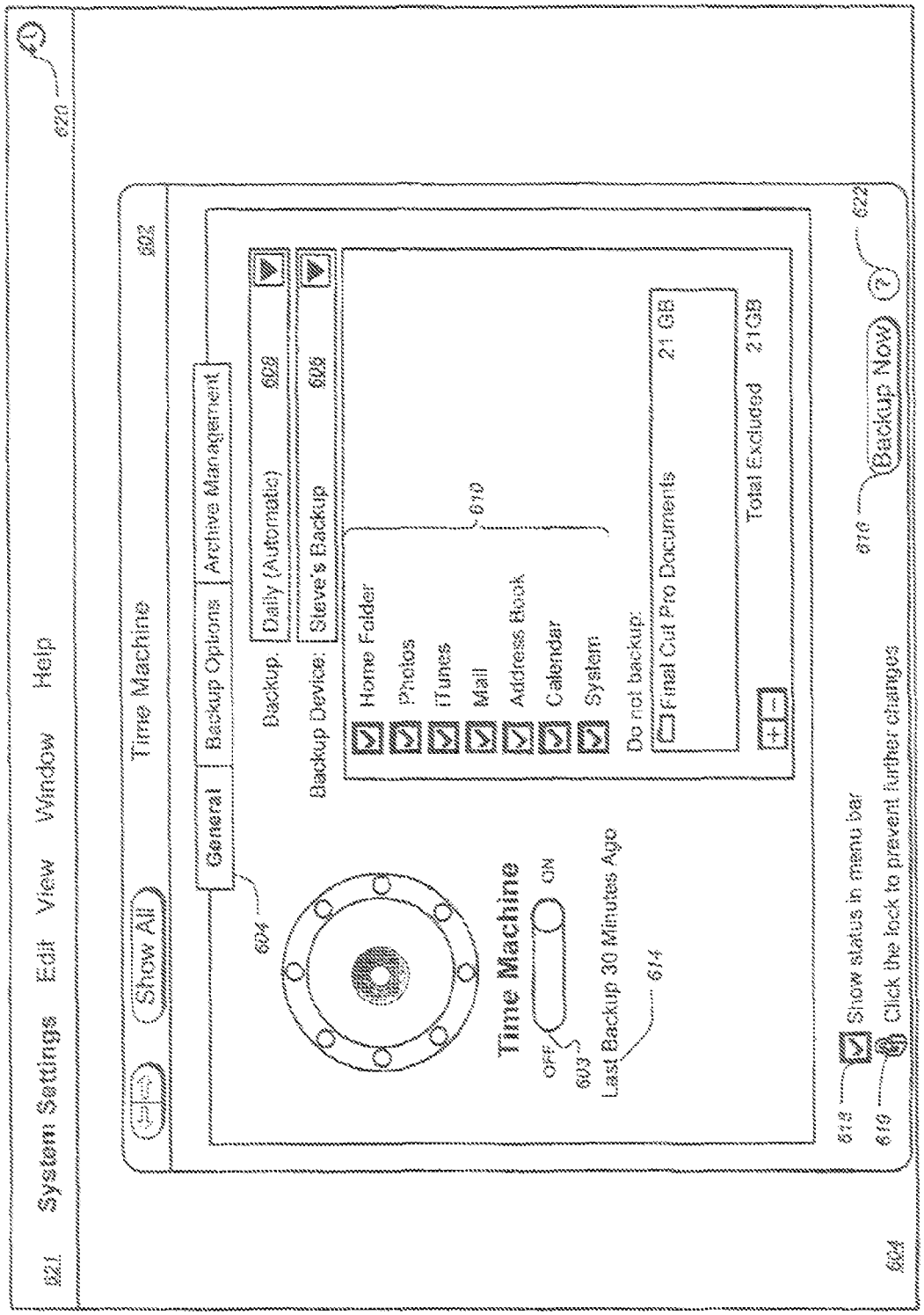
FIG. 6 shows a screen shot depicting an example of a time machine settings dialog within a desktop user interface.

FIG. 6 shows a screen shot depicting an example of a time machine settings dialog 602 within a desktop user interface 604. In one implementation, the dialog 604 is generated by the preference management engine 214 (FIG. 2). A general settings tab 604 is selected. A user can select a drop down menu 606 to establish backup location. The user can select a slide bar control 603 to switch the backup operations on or off. A drop-down menu 608 can be used to set the frequency of making backups (e.g. every day, every week, every other week, every month, etc.). In another implementation, a time of day or other granularity setting can be available. Such a setting would allow the user to request that the utility run during a typically inactive period, such as overnight. In one implementation, an event-driven trigger can be specified, such as having the backup utility run upon system start-up. In another example of an event-driven trigger, the time machine could be set to back up when there has been activity relating to the item that is to be backed up. In one implementation, the backup operation can be set to run in periods of inactivity when there can be less user demand on system performance.

A user can select from a set of applications 610 which type(s) of data is eligible for a backup. The applications list can contain specific products (e.g. iTunes) and/or general categories (e.g. photos, address book, e-mail inbox). In one implementation, each application name can be individually selectable. For example, within an internet browser application, the user can set the bookmarks and personal settings to be backed up but not the history or cookies. One implementation can allow a user to select specific disk drives, folders, and/or files for inclusion in a backup.

A message block 614 alerts the user as to the date and time of the last backup event. As shown in FIG. 6, the last backup occurred thirty minutes earlier. In one implementation, this information is obtained from the backup capture engine 220 (FIG. 2). A user can select a backup now button 616 to trigger a backup event. In one implementation, the backup now button 616 calls the backup capture engine 220 (FIG. 2) to initiate a capture event using the settings provided within the time machine settings dialog 602.

If a checkbox 618 is selected, the time machine engine provides a status icon 620 within a menu bar 621 of the desktop user interface 604. The status icon 620 can alter in appearance depending upon the time machine engine's status, e.g. when the time machine engine is disabled, when it is actively backing up files, or when it is in standby mode, etc. The status icon 620 can provide the user with an additional method of accessing the time machine settings dialog 602. In one implementation, a different type of status indicator can be used, or a different way of initiating it can be provided.

If a lock icon 619 is selected, the time machine engine backup configuration is essentially locked into place until the icon 619 is selected again. For example, selecting the lock icon 619 in the settings dialog 602 can ensure daily (automatic) backup operations are performed using backup device 606 ("Steve's backup device") as the storage medium until the lock icon 619 is selected, thus unlocking the current backup configuration.

A user can select a help button 622 to open a help dialog regarding the time machine settings. The help dialog can be presented within the time machine settings dialog 602 or in a separate pop-up window, for example. In another implementation, a mouse over of individual controls within the time machine settings dialog 602 can provide the user with a brief description of that control's functionality.

Figure 7:
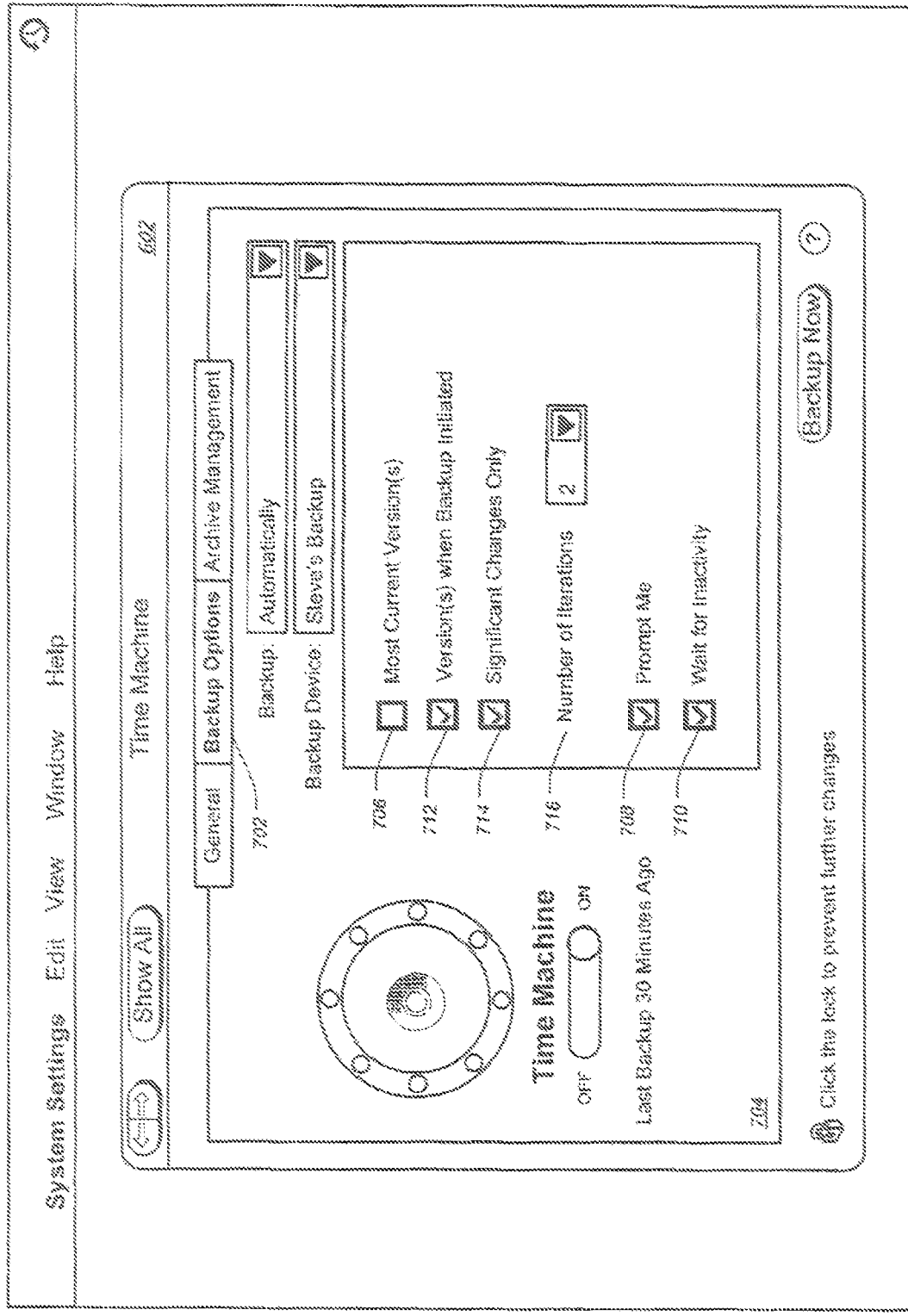
FIG. 7 shows a screen shot depicting an example of a time machine settings dialog in which a backup options tab is selected.

FIG. 7 shows a screen shot depicting an example of the time machine settings dialog 602 in which a backup options tab 702 is selected. A backup options view 704 allows the user to configure the process of storing archived items. In this example, several options are presently available to the user. A user can select a "Most Current Version(s)" option 706 to indicate that the backup should include the most current versions of data each time a backup operation occurs. In one implementation, this corresponds to the example in FIG. 3. The user can also choose a "Prompt Me" option 708 to be prompted each time a backup operation is initiated. The user can then decide whether or not to back up the current version, or alternatively decide to back up multiple versions of consistent data. For example, the user can choose to back up the original version, and a second, resolved version. In addition, the user can select a "Wait for Inactivity" option to postpone the backup operation until the data is not being used, or similarly, when the user is not actively using the computer system.

As shown in FIG. 7, the user can also select a "Version(s) when Backup Initiated" option 712 to back up data as it existed when the backup operation initiated. In this example, the time machine engine can store the version available at the time of a backup operation. In one implementation, this corresponds to the example in FIG. 4. Thus, any modifications made after the backup operation has been initiated would not be included in the current backup version. In some implementations, the user can be prompted to save one or more versions of the files if an inconsistency is identified.

Another option available in the backup options view 704 is a "Significant Changes Only" option 714. The "Significant Changes Only" option 714 can use predefined or user-entered criteria to determine which changes are sufficient to trigger a new backup version. The "Significant Changes Only" option 714 can be applied to both the "Most Current Version(s)" option 706 and the "Version(s) when Backup Initiated" option 712.

The backup options view 704 includes a "Number of Iterations" option 716 allowing the user to limit the number of times a backup operation is attempted when the monitoring detects changes being done during the backup operation.

Figure 8:
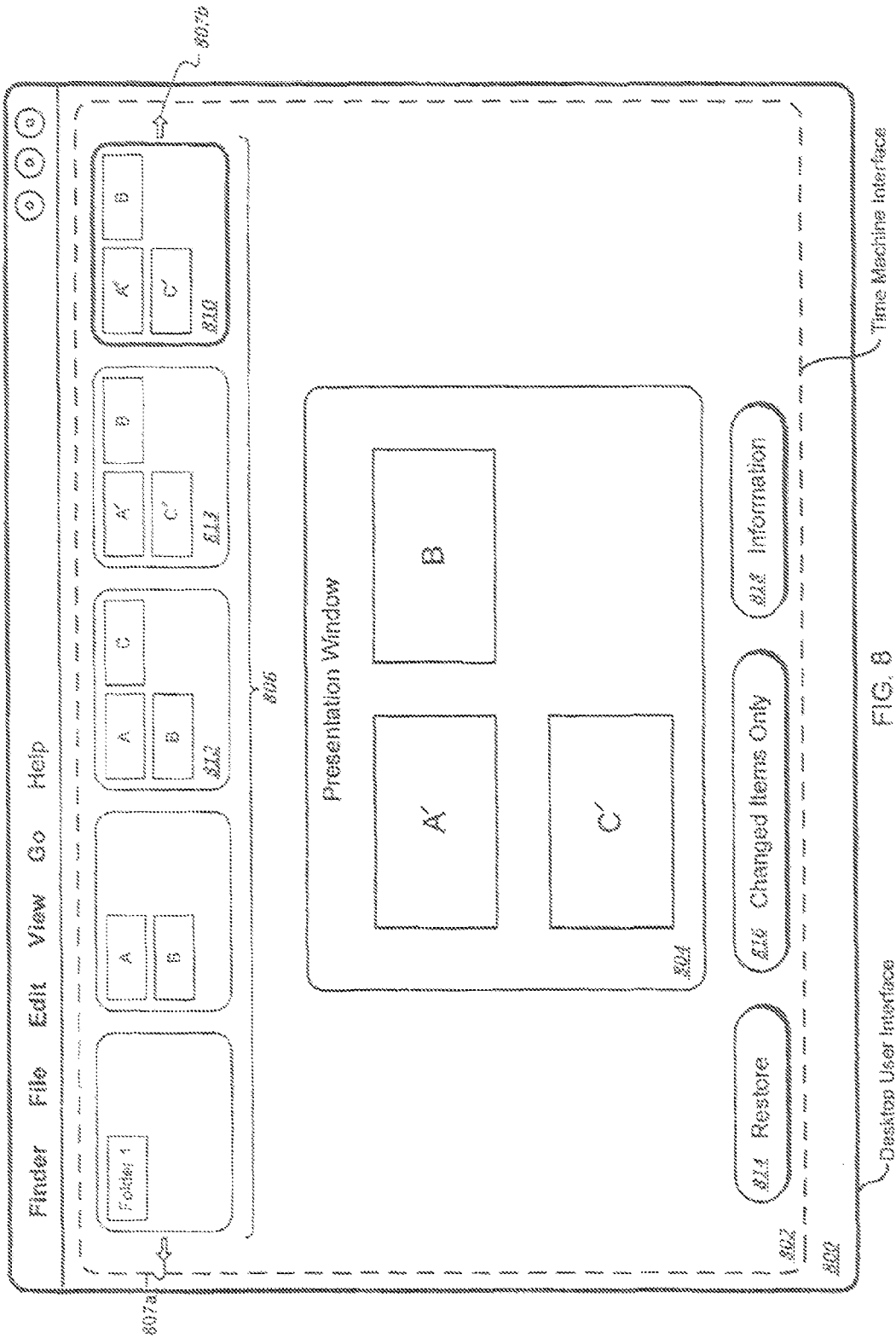
FIG. 8 is a screen shot depicting an example of a time machine user interface after the time machine engine has been activated.

As noted above, the management of backup versions can be handled by the backup component 117 (FIG. 1). That component can generate a time machine interface with which the user can control the restoration of selected content and see the results thereof. Such an interface can be generated by the backup restoration engine 222 (FIG. 2). There will now be described an example of how such an interface can reflect a modification of a previously backed up element. FIG. 8 is a screen shot depicting an example of a time machine user interface after the time machine engine has been activated. The time machine interface 802 includes a presentation window 804, a timeline 806, and function buttons. The timeline 806 presents a history view associated with the current view. The time machine interface 802 is shown in FIG. 8 as a layer differentiated from the desktop user interface 800 by a dashed line around the perimeter of the user interface. In one implementation, the desktop user interface 800 and an associated application window are obscured or otherwise hidden while the time machine is active.

The presentation window 804 can show the currently selected snapshot, or a portion thereof. As used herein, a snapshot refers to a backup element stored in an archive that includes a backup of selected items or content as specified by the backup component 117. Alternatively, the presentation window 804 can show a selected one of several available snapshots. In one example, a user can operate the time machine interface 802 so as to sequentially select each snapshot and can restore elements from these selected snapshots until the current version engulfs the entire history of the timeline 806, or some portion thereof. For example, the user can select a snapshot in the timeline 806 and merge its contents with the contents of the current presentation window 804 by restoring each element individually, and keeping both versions in some cases, to achieve a merged list of elements. In some implementations, the active window can be scaled upon entering the time machine to fit within the interface. For example, if an application is running in full screen mode (e.g., iTunes) when the time machine session is initiated, the application window can be scaled down to fit within the time machine interface.

The timeline 806 can include a number of snapshots representing slices of time for active window elements. Each snapshot provides a screenshot representation of an earlier version of the selected application at a particular point in time. The snapshots can represent periodic backup points in time or can represent snapshots of the active window where a change has occurred.

Arrow buttons 807a and 807b shown to the left and right of the snapshots allow the user to navigate additional snapshots not shown, thus there can be a large number of snapshots to select from.

In some implementations the timeline 806 includes a visual representation of elements, and can appear across the top portion of the time machine interface 802 (as shown). Alternatively, the timeline 806 can not appear in the top portion of the time machine interface 802 until a user moves their cursor to the top portion of the time machine interface 802.

In alternative implementations, all snapshots can be shown according to when they are taken regardless of changes between snapshots. In another alternative implementation, the snapshot can indicate a range of time covered by a single snapshot where no changes have occurred (e.g., Jun. 1-Aug. 8, 2005). In another implementation, the rate of snapshots can vary over time. For example, there can be a number of snapshots in the newest archives, but the snapshots become more spaced in time as they reach further into the past. For example, hourly snapshots for the current day can turn into daily snapshots, which turn into weekly snapshots that become monthly snapshots as their file dates reach further into the past. The transition to later snapshots can be achieved, in one implementation, by selecting a representative snapshot from a group of snapshots and deleting the rest.

As shown in FIG. 8, a most recent snapshot 810 is shown with a highlighted border. This represents the present state of the contents of the presentation window 804. The other snapshots shown in the timeline 806 represent states of the selected application in the past. For example, the snapshot 812 represents a state that the folder 306 (FIG. 3) has at the time $T_A$. As such, the snapshot 812 corresponds to a backup performed at or before $T_A$. Next, a snapshot 813 is the backup ultimately created in the FIG. 3 example. As described above, changes are monitored during the backup operation and the backup folder is modified to include A', B and C', the state at the end of the initial backup operation. Accordingly, the snapshot 813 here is identical to the most recent snapshot 810, which corresponds to the current state.

The other snapshots in the timeline 806 can show other configurations of past states of the selected application. For example, different numbers of elements show additions and deletions have occurred over time. The time machine interface 802 can also show modifications that have been made between different versions of folders, files, or items, and the like.

The time machine interface 802 includes a restore button 814, a changed items only button 816, and an information button 818. Other buttons are possible. The restore button 814, when selected, restores the window to the selected state represented by the selected snapshot presented within the presentation window 804 and exits the time machine interface 802 (e.g., restoring the desktop user interface 800). A user can select a snapshot and then select the restore button 814 to modify the current version of the element selected. The changed items only button 816 filters the snapshots to show only those that differ vary from the current state. That is, the changed items only button 816 does not refer to the incremental changes between snapshots in the timeline 806, rather, it refers to omitting those snapshots whose states are identical to the current state of the selected application window. For example, if the most recent snapshot 810 is identical to a snapshot 812 that occurs earlier in time, selecting the changed items only button 816 will cause the time machine to cease displaying one of the copies, e.g., remove the snapshot 812 from the timeline. This can help the user locate a previous version from which to restore contents different than those in the current version.

The information button 818 provides information regarding the selected snapshot. In one implementation, selecting the information button 818 opens a panel display. The panel display provides, in one implementation, information including: the date and time the snapshot was made; the location of actual elements of a snapshot; the size of the snapshot; and a comment section.

There will now be described an example of how a time machine interface can reflect a backup created when file modifications during backup operations are deliberately omitted. FIG. 9 is a screen shot depicting another example of a time machine user interface after the time machine engine has been activated. A most recent snapshot 902 is shown with a highlighted border. This represents the present state of the contents of the presentation window 804. The other snapshots shown in the timeline 806 represent states of the selected application in the past. For example, the snapshot 812 represents a state that the folder 406 (FIG. 4) has at the time $T_A$. As such, the snapshot 812 corresponds to a backup performed at or before $T_A$. Next, a snapshot 904 is the backup ultimately created in the FIG. 4 example. As described above, changes are monitored during the backup operation and the backup folder is modified to include A, B and C, the state at the beginning of the initial backup operation. Accordingly, the snapshot 904 here is identical to the snapshot 812, which corresponds to the state of the folder at time $T_A$.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method performed by one or more processors for backing up files, the method comprising the following operations:
   initiating a backup operation of a plurality of related files;
   determining a first file in the plurality of related files was modified prior to executing the backup operation on the first file;
   executing the backup operation on the modified first file to generate a backed-up file of the modified first file;
   determining the backed-up file of the modified first file includes data inconsistent with data in a backed-up file of a second file in the plurality of related files, wherein the determination includes comparing data in the backed-up file of the modified first file with related data in the backed-up file of the second file; and
   replacing the backed-up file of the modified first file with a version of the first file that existed prior to the modified first file.

2. The method of claim 1, wherein the plurality of items are interdependent.

3. The method of claim 1, wherein determining the first file in the plurality of related files was modified includes identifying an event notification associated with the first file in the plurality of related files.

4. The method of claim 1, further comprising monitoring for modifications to one or more items of the plurality of related items while replacing the backed-up file of the modified first file.

5. The method of claim 1, further comprising determining a maximum number of backup operations to perform to complete a backup operation without modifications occurring during the backup operations.

6. The method of claim 5, further comprising generating an alert in response to reaching the maximum number of backup operations.

7. The method of claim 6, wherein generating an alert includes notifying a user.

8. The method of claim 5, further comprising suspending the backup operation for a predefined period of time in response to reaching the maximum number of backup operations.

9. A computer program product encoded on a tangible, non-transitory storage medium, the product comprising computer readable instructions for causing one or more processors to perform operations comprising:
   initiating a backup operation of a plurality of related files;
   determining a first file in the plurality of related files was modified prior to executing the backup operation on the first file;
   executing the backup operation on the modified first file to generate a backed-up file of the modified first file;
   determining the backed-up file of the modified first file includes data inconsistent with data in a backed-up file of a second file in the plurality of related files, wherein the determination includes comparing data in the backed-up file of the modified first file with related data in the backed-up file of the second file; and
   replacing the backed-up file of the modified first file with a version of the first file that existed prior to the modified first file.

10. The computer program product of claim 9, wherein the plurality of items are interdependent.

11. The computer program product of claim 9, wherein determining the first file in the plurality of related files was modified includes identifying an event notification associated with the first file in the plurality of related files.

12. The computer program product of claim 9, the instructions further comprising monitoring for modifications to one or more items of the plurality of related items while replacing the backed-up file of the modified first file.

13. The computer program product of claim 9, the instructions further comprising determining a maximum number of backup operations to perform to complete a backup operation without modifications occurring during the backup operations.

14. The computer program product of claim 13, the instructions further comprising generating an alert in response to reaching the maximum number of backup operations.

15. The computer program product of claim 14, wherein generating an alert includes notifying a user.

16. The computer program product of claim 13, the instructions further comprising suspending the backup operation for a predefined period of time in response to reaching the maximum number of backup operations.

17. A device, comprising:
   memory for storing back up data; and
   one or more processors configured to:
      initiate a backup operation of a plurality of related files;
      determine a first file in the plurality of related files was modified prior to executing the backup operation on the first file;
      execute the backup operation on the modified first file to generate a backed-up file of the modified first file;
      determine the backed-up file of the modified first file includes data inconsistent with data in a backed-up file of a second file in the plurality of related files, wherein the determination includes comparing data in the backed-up file of the modified first file with related data in the backed-up file of the second file; and
      replace the backed-up file of the modified first file with a version of the first file that existed prior to the modified first file.

18. The device of claim 17, wherein the processors configured to determine the first file in the plurality of related files was modified includes the processors configured to identify an event notification associated with the first file in the plurality of related files.

19. The device of claim 17, the processors further configured to monitor for modifications to one or more items of the plurality of related items while replacing the backed-up file of the modified first file.

20. The device of claim 17, the processors further configured to determine a maximum number of backup operations to perform to complete a backup operation without modifications occurring during the backup operations.

* * * * *